No. 666,218. Patented Jan. 15, 1901.
J. E. & J. A. EBERSOLE.
COUPLING AND STEERING CONNECTION FOR VEHICLES.
(Application filed June 22, 1900.)
(No Model.)
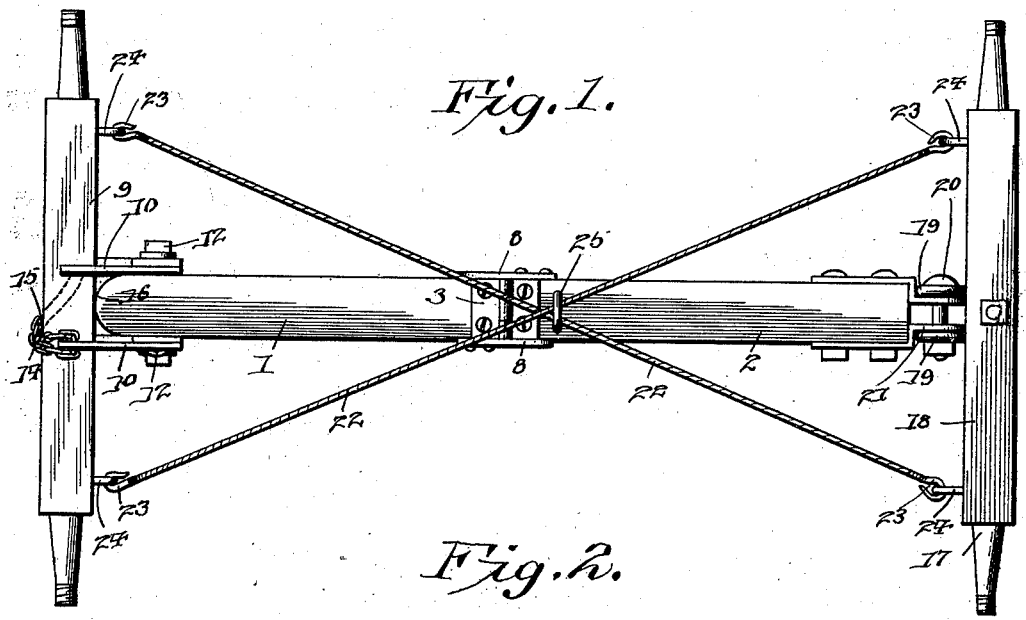
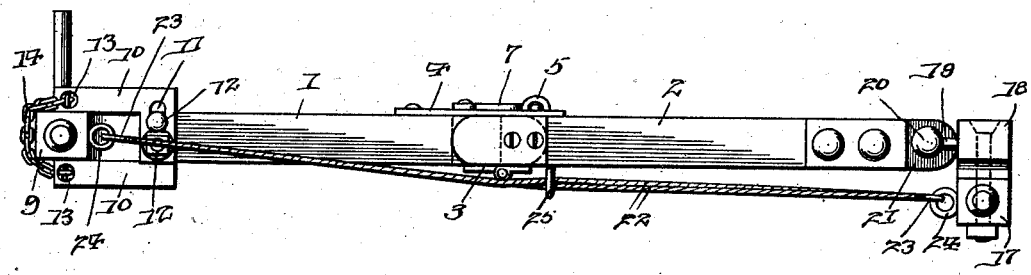
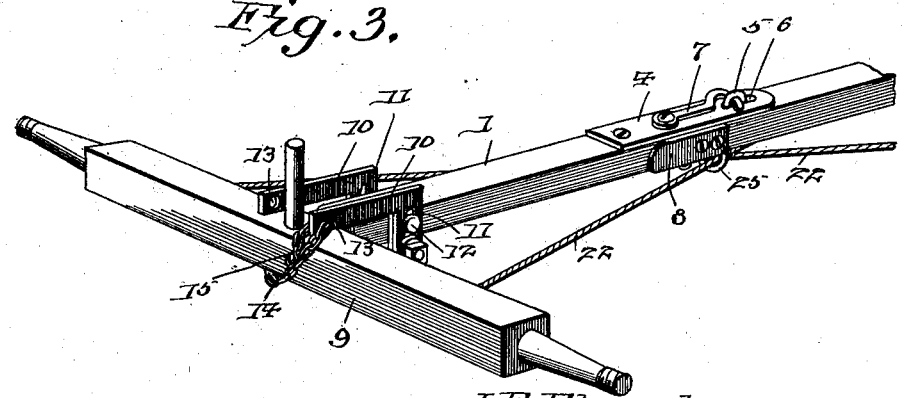
Witnesses
Howard D. Orr
J. E. Ebersole AND
J. A. Ebersole. Inventors,
Attorneys

UNITED STATES PATENT OFFICE.

JAMES E. EBERSOLE AND JACOB A. EBERSOLE, OF CAMPBELLTOWN, PENNSYLVANIA.

COUPLING AND STEERING CONNECTION FOR VEHICLES.

SPECIFICATION forming part of Letters Patent No. 666,218, dated January 15, 1901.

Application filed June 22, 1900. Serial No. 21,215. (No model.)

*To all whom it may concern:*

Be it known that we, JAMES E. EBERSOLE and JACOB A. EBERSOLE, citizens of the United States, residing at Campbelltown, in the county of Lebanon and State of Pennsylvania, have invented a new and useful Coupling and Steering Connection for Vehicles, of which the following is a specification.

This invention relates to coupling and steering connections for vehicles, and has for its object to provide an improved device combining both of these features and which is especially designed for connecting a traction-engine to a grain-separator, so that the latter may be conveniently drawn and guided solely by the engine. It is furthermore designed to provide an adjustable connection with the traction-engine, so that the coupling may be applicable to engines of different sizes, and also to provide a foldable device, so as to be conveniently stored when not in use, and to tighten the steering connections between the two vehicles.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details of construction and arrangement may be made within the scope of the claims without departing from the spirit or sacrificing any of the advantages of the invention.

In the drawings, Figure 1 is a bottom plan view of a coupling constructed and arranged in accordance with the present invention. Fig. 2 is a side elevation thereof. Fig. 3 is a detail perspective view of the forward end of the device which is to be connected to a traction-engine.

Corresponding parts are designated by like characters of reference in all of the figures of the drawings.

Referring to the drawings, it will be seen that there is employed a coupling-pole formed in two substantially equal sections 1 and 2, which have their inner ends connected by means of a hinge 3, which is secured to the lower sides of the pole-sections, so that the latter may fold upwardly, but are held rigidly against a downward break by reason of the abutted inner ends thereof. To hold the pole-sections in their normally alined or extended position, a plate or bar 4 is fastened to the upper side of one of the sections and arranged to overlap the adjacent inner end of the other section. The latter is provided with an eye or keeper 5, which is designed to project through a slot or opening 6 in the free end portion of the plate or bar and for the reception of a key, preferably in the form of a hook 7, pivoted to the outer side of the plate or bar. Also each pole-section is provided with a brace-plate or projection 8 to overlap the joint between the two sections, and thereby relieve the joint of any lateral strain.

The outer end of the forward pole-section 1 is designed to be connected to the front swiveled axle 9 of any ordinary traction-engine by means of pairs of substantially L-shaped coupling-plates 10, which are located at opposite sides of the pole. The members of each pair of plates are located one above the other, with their longer branches projecting in advance of the pole, while their shorter branches are overlapped and extend transversely across the pole. These shorter branches are provided with corresponding longitudinal slots 11 for the reception of transverse fastenings, such as bolts 12, whereby the plates are secured to the pole, and may be adjusted in opposite directions, so as to vary the distance between the members for the purpose of accommodating the different sizes of axles which are received between the plates, as shown in Fig. 2 of the drawings. The outer end of each plate is provided with an opening 13, and within one of the openings is secured one end of a chain or suitable flexible connection 14, which is designed to be passed around the inner side of the axle of the engine and through the opening in the diagonally opposite coupling-plate, the free end of the chain being provided with a hook 15, which is engaged with one of the links of the chain, so as to form a connection between the engine and the coupling. As best shown in Fig. 1, the forward end of the front pole-section is rounded laterally, as at 16, so that the axle 9 may rock laterally thereon when the engine is being turned.

The rear end of the pole is designed to be connected to the front axle 17 of a grain-separator, which is commonly provided with a swiveled bolster 18, and the pole is connected directly to this bolster, so that the axle may be free to turn laterally and track with the axle of the engine. This connection between the pole and the axle of the separator is preferably had by means of a vertically-breaking hinged connection formed by means of a pair of screw-eyes 19, which project forwardly from the bolster and at opposite sides of the swiveled connection with the axle and for the reception of a transverse pivot pin or bolt 20, which is carried by a pair of metallic ears 21, projected rearwardly from the pole and received between the eyes. The adjacent axles of the engine and the separator are also connected by means of crossed cables 22, which are provided with hooks 23 at their ends for engagement with eyes 24, projecting from the outer faces of the axles. The crossed portions of the cables pass through a guide-eye 25, which is pendent from the under side of the rear pole-section and adjacent to the hinged connection of the two sections. By this arrangement the axle of the separator is automatically turned with the axle of the engine, so that the wheels of the separator are compelled to track with those of the engine. Thus the separator is guided by the engine and does not require the employment of extra hands to guide the separator independently of the engine.

From the foregoing description it will be seen that no change is required in either the engine or the separator, and therefore the present device is complete in itself and may be applied to any form of traction-engine and separator. By reason of the hinged connection of the pole-sections the device may be folded for storage. Also the connections are made with the engine and the separator, while the hinged connection 3 is broken upwardly, after which the inner ends of the pole-sections are forced downwardly, so as to tighten the steering connections 22, and thereby take up whatever slack they may have.

What is claimed is—

1. The combination with the adjacent axles of opposite vehicles, of a coupling-pole, having its opposite ends connected to the respective axles, and also provided with an intermediate hinged joint.

2. The combination with the adjacent axles of opposite vehicles, of a coupling-pole formed into sections, the inner ends of the latter being hingedly connected to break upwardly and also abutted in their normal positions, the opposite ends of the pole being connected to the respective axles.

3. A sectional coupling-pole of the class described, having its opposite ends provided with connections for application to respective vehicles, a hinged connection for the inner ends of the sections, a plate or bar carried by one of the sections and overlapping the joint, a keeper carried by the other section and projecting through a slot in the plate or bar, and a key carried by the plate and for engagement with the keeper.

4. The combination with the adjacent swiveled axles of opposite vehicles, of a coupling-pole having its opposite ends connected to the respective axles, and also provided with an intermediate flexible joint, which is breakable vertically, and crossed flexible steering connections having their opposite ends fastened to the respective axles.

5. The combination with a pair of axles, one of which is swiveled, of a coupling-pole therefor, a loose connection between the swiveled axle and the adjacent end of the pole, and the latter having a laterally-rounded end to permit of a laterally-rocking movement of the axle.

6. The combination with an axle, and a coupling-pole, of a connection therefor, comprising a pair of substantially L-shaped plates or bars, which are arranged one above the other, the transverse branches thereof being overlapped transversely across the pole and provided with corresponding slots, fastenings passing through the slots and adjustably connecting the plates or bars to the pole, and the opposite longitudinal branches embracing the axle and also connected thereto.

7. The combination with opposite swiveled axles, one of which has a bolster swiveled thereon, of a coupling-pole, having a vertically-breakable hinged connection with the bolster, the opposite axle having a laterally-rocking connection with the other end of the pole, and crossed steering connections having their opposite ends connected to the bolster and the opposite axle, respectively.

8. A coupling-pole of the class described, having two pairs of substantially L-shaped coupling plates or bars located at opposite sides of one end thereof, the members of each pair being located one above the other, with their respective longitudinal branches projecting beyond the end of the pole, and the transverse branches being overlapped transversely across the adjacent side of the pole and provided with corresponding longitudinal slots, one or more fastenings passing through the slotted members of both pairs of plates or bars and the pole, and a chain having one end connected to the outer end of one of the L-shaped members, the opposite end of the chain being passed through an opening in one of the other members, and hooked into one of the links.

In testimony that we claim the foregoing as our own we have hereto affixed our signatures in the presence of two witnesses.

JAS. E. EBERSOLE.
JACOB A. EBERSOLE.

Witnesses:
LAVINA WALTERS,
SUSAN BOWMAN.